April 13, 1965 W. G. PETTITT 3,178,685
PRESENCE DETECTION SYSTEM
Original Filed Nov. 10, 1960 3 Sheets-Sheet 1

INVENTOR.
W.G. PETTITT
BY
HIS ATTORNEY

April 13, 1965  W. G. PETTITT  3,178,685
PRESENCE DETECTION SYSTEM
Original Filed Nov. 10, 1960  3 Sheets-Sheet 3

INVENTOR.
W.G. PETTITT
BY
*Forest B. Hitchcock*
HIS ATTORNEY

United States Patent Office 3,178,685
Patented Apr. 13, 1965

3,178,685
PRESENCE DETECTION SYSTEM
Walter G. Pettitt, Rochester, N.Y., assignor to General Signal Corporation, a corporation of New York
Continuation of application Ser. No. 68,532, Nov. 10, 1960. This application Dec. 6, 1963, Ser. No. 329,349
7 Claims. (Cl. 340—38)

This invention relates to a presence detection system, and, more particularly, pertains to the detection of a conveyance within a defined area for causing suitable indications thereof.

This is a continuation of my copending application Ser. No. 68,532 filed November 10, 1960 which has now been abandoned.

The possibility of detecting the presence of a conveyance in a defined area is evidenced by the various disclosures shown in the prior art. Most of such disclosures depend upon the presence of a conveyance in a detector loop associated with an oscillator for changing the frequency of the oscillator to the extent where an accompanying circuit is controlled. More particularly, many such disclosures include an oscillator which is normally effective to hold a relay means in either an energized or deenergized condition, while the presence of a conveyance in the detector loop associated with the oscillator is effective to cause the relay means to be operated to the opposite condition where a suitable indication is given. The detection of a conveyance has been additionally attained by employing a plurality of detector loops which are normally electromagnetically coupled for controlling an associated indication means to one condition, while the presence of a conveyance in any one of the detector loops is effective to decouple the plurality of loops in a manner to cause a different indication to be rendered. In each instance, however, the predominating characteristic of holding the controlled circuit means in one condition during the absence of conveyances and causing the controlled circuit means to be operated to the opposite condition when a conveyance is detected is present.

In the present invention, a presence detection system is proposed which is effectively normally operated between two distinct conditions of operation at a predetermined rate with suitable indications being provided therefor. It is further proposed in this invention that the presence of a conveyance in a defined area be effective to cause one of the normal conditions of operation to be predominate for the interval that the conveyance is within the defined area. Moreover, the present invention proposes that a dstinctive indication be provided for each of the two distinct conditions under normal operation with a distinctive indication other than the two distinct indications mentioned above being provided for indicating the presence of a conveyance within the defined area.

In the present invention, several advantages are attained which are inherent with the character thereof as contrasted to that disclosed by the prior art. In the operation of the system organization under normal conditions, i.e., when no conveyance is detected as being within the defined area, appropriate indications are provided which are indicative of this normal condition. When a conveyance is detected in the defined area, however, the system organization is also operative to indicate this condition. For other conditions of operation, i.e., where some component of the system has failed to operate properly, the circuit organization is adapted to provide an indication which is indicative of the presence of a conveyance within the defined area. Thus, failure of the circuit organization to operate properly provides an indication of detection even though a conveyance is not actually within the defined area. Moreover, operation of the system organization in this manner provides a means of checking that the system is operating and will be effective to detect a conveyance which comes within the defined area.

Thus, one object of this invention is to provide a system organization adapted to normally operate between two distinct conditions of operation at a predetermined rate with characteristic indications being provided for each distinct condition of operation.

Another object of this invention is to provide a system organization adapted to be interrupted from its normal operation according to the presence of a conveyance in a defined area and for the interval therein.

Another object of this invention is to provide a system organization which is normally operative between two distinct conditions of operation and which is adapted to operate to that condition of operation according to component failure wherein an indication of detection is provided.

Another object of this invention is to provide a system organization which is capable of being controlled between its two distinct conditions of normal operation by either an internal or external means.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts through the several views, and in which.

Figure 1:
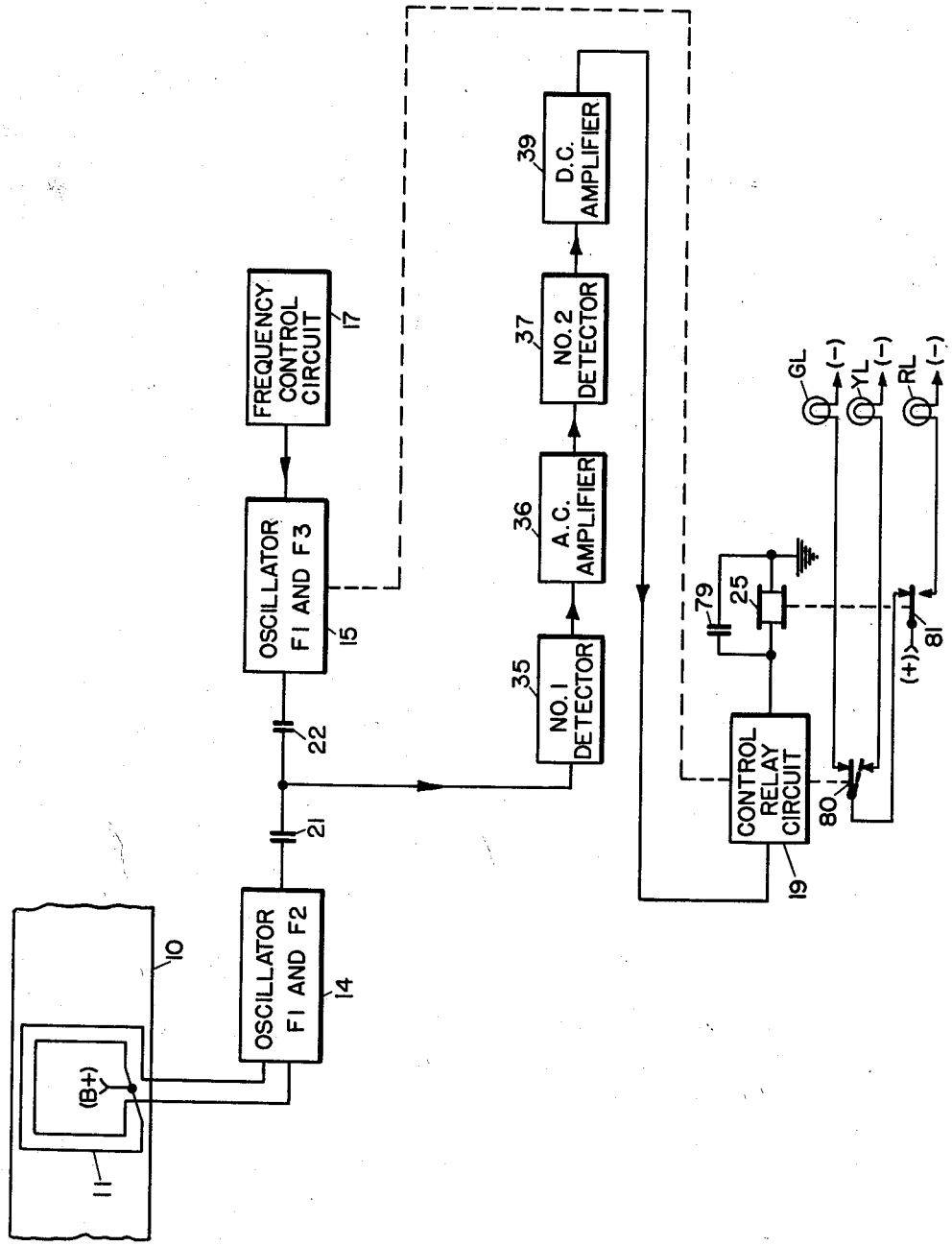
FIG. 1 illustrates substantially by block diagram the present invention.

For the purpose of simplifying the illustrations and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner, and the symbols (+) and (−) in addition to the symbols (B+) and (B−) are used to indicate connection to the opposite terminals of suitable batteries, or other sources of electric current, instead of showing all of the wiring connections to these terminals.

*System apparatus*

With reference to FIGS. 1–4, the apparatus employed in the present invention may be generally described. A portion of a route 10 over which conveyances of different types may suitably travel and into which a coil loop 11 is suitably embedded so as to be in the path of conveyances travelling over route 10 is shown. The types of conveyances adapted to travel over route 10 may include airplanes, vehicles including both cars and trucks, and other movable conveyances each of which is at least partially constructed of a material such as metal for influencing the inductance of coil loop 11.

The coil loop 11 is connected to an oscillator 14 which is normally oscillating at a frequency F1 and which may be changed to a frequency F2 according to the presence of a conveyance with the confines of coil loop 11. Another oscillator 15 is provided which also has the oscillating frequency F1 and which additionally is controlled to oscillate at a frequency F3 according to the control thereof by a frequency control circuit 17 or, alternately, the control thereof by a control relay circuit 19. Respective outputs from oscillators 14 and 15 are coupled through capacitors 21 and 22 to a combination of circuit means provided for the purposes of detecting any difference frequency existing between the current oscillating frequencies of oscillators 14 and 15, amplifying such detected difference frequency, rectifying the amplified difference frequency signal, and employing such rectified direct current signals to cause corresponding direct current signals to be produced at the output. The direct current outputs are supplied to a control relay circuit 19 provided for the purpose of responding to the conditions established by the combination of circuit means. An indication circuit means which includes a relay 25 and indicating lamps GL, YL, and RL is controlled according to the responsive or nonresponsive conditions of control relay circuit 19 and is provided for he purpose of indicating the normal operation of the system organization in addition to providing an indication according to the presence of a conveyance within the coil loop 11.

Each of the oscillators 14 and 15 is commonly referred to as a series-feed Hartley oscillator. In each instance, a portion of the tank circuit, the triode type tube and the power supply form a series circuit. For oscillator 14, this series circuit extends from (B+), through a portion of the coil loop 11, through the triode type tube T1, to (B—), while for oscillator 15, the series circuit extends from (B+), through a portion of the tank coil 30, through the triode type tube T2, to (B—). Under normal conditions, i.e., when no conveyance is within the area defined by coil loop 11, the frequency of oscillation 14 is determined by the values of coil loop 11 and a capacitor 23 which comprise the tank circuit for oscillator 14. The frequency of oscillation for oscillator 15 is determined by the values of coil 30 and a capacitor 31 which form the tank circuit for oscillator 15. At times, during normal operating conditions, the capacitor 28 is effectively connected across a portion of the tank coil 30 to change the frequency of oscillation for oscillator 15.

The capacitors 21 and 22 are additionally employed to provide synchronism between oscillators 14 and 15. That is, each of the capacitors 21 and 22 has a value such that the combination thereof is effective to overcome electrical disturbances resulting from changing weather conditions and/or slight changes in component values to the extent that no noticeable difference frequency can exist between oscillators 14 and 15 for the oscillating frequency F1.

A frequency control circuit 17 is provided for the purpose of biasing a diode 27 which permits the capacitor 28 to be connected into and out of circuit relationship with tank coil 30 at a predetermined rate. The frequency control circuit 17 includes a free-running multivibrator of especial design which is adapted to at all times initiate operation with the application of supply voltage. This insures that the capacitor 28 is effective from the inception of circuit operation which will be discussed in more detail hereinafter. In place of frequency control circuit 17 which may be considered an external control, internal control may be provided by control relay circuit 19 for connecting and disconnecting a capacitor 32 into the tank circuit including tank coil 30 and capacitor 31 for effecting a change of the frequency of oscillation for oscillator 15.

Control relay circuit 19, normally employed to be responsive to outputs provided by the combination of circuit means discussed above, may also be employed to control the frequency of oscillation for oscillator 15 during normal operating conditions. In this respect, a relay of the neutral type included with the control relay circuit 19 responsive to the outputs provided by the circuit means is at times adapted in one condition thereof to control the frequency of oscillation for oscillator 15. A timing circuit is employed with this relay for establishing the rate at which a controlled circuit is adapted to connect and disconnect the capacitor 32 with tank coil 30. In another instance, two neutral type relays are provided where one relay is controlled by the outputs from the circuit means and the other relay is responsive to the conditions of the one relay and additionally to a timing circuit for controlling the frequency of oscillation for oscillator 15.

The combination of circuit means provided for detecting any difference frequency existing between the current oscillating frequencies of oscillators 14 and 15, amplifying this difference frequency, rectifying the amplified difference frequency signal, and further employing these rectified direct current signals to provide outputs to the control relay circuit 19 includes circuits for both effecting the function commonly referred to as heterodyning and for converting the amplified heterodyne signal to an amplified pulse output. The frequencies coupled from oscillators 14 and 15 through capacitors 21 and 22 are supplied to a detector 35 where they are combined and where the difference frequency, if any, is detected. The difference frequency is then supplied to an alternating current amplifier 36 where it is amplified with the resulting amplified signal then being supplied to a detector 37 which is provided for the purpose of converting the alternating current signal characteristic of the difference frequency to a direct current signal. The direct current signal is then supplied to a direct current amplifier 39 which is provided for the purpose of amplifying the direct current signals and further controlling the output supplied to control relay circuit 19.

The indication circuit means which includes relay 25 and indicating lamps GL, YL and RL is provided for the purpose of indicating the normal operation of the system organization and providing an indication according to the presence of a conveyance within the area defined by coil loop 11. Relay 25 is a neutral type relay and is adapted to remain in its energized condition under normal operating conditions of the system organization. Indication lamps GL and YL are adapted to be illuminated alternately according to the energized condition of relay 25 with the alternate illumination thereof being indicative of proper system operation. Indication lamp RL is adapted to be illuminated according to the deenergized condition of relay 25 for being indicative of the presence of a conveyance within the area defined by coil loop 11 or that the system organization is malfunctioning.

It is believed that the nature of the invention, its advantages and characteristic features can be best understood with further description being set forth from the standpoint of operation.

*Operation*

Under normal conditions, i.e., when the area defined by coil loop 11 is devoid of conveyances, two conditions of operation normally obtain. In one of these conditions of operation, both of the oscillators 14 and 15 are adapted to oscillate at the frequency F1. During the second condition of operation, the frequency of oscillation for oscillator 15 is changed to frequency F3 for an interval as determined by frequency control circuit 17 or, alternately, control relay circuit 19. During these two conditions of operation, the indication lamps GL and YL are alternately illuminated and deenergized at a predetermined rate which is indicative of normal system operation.

If it is assumed that both oscillators 14 and 15 have similar frequencies of oscillation, certain circuit conditions prevail. The diode 27 is effectively biased by frequency control circuit 17 so as to provide that capacitor 28 is disconnected from the upper portion of tank coil 30.

This biased condition of diode 27 is effected according to the direct current output provided by frequency control circuit 17.

Figure 2:
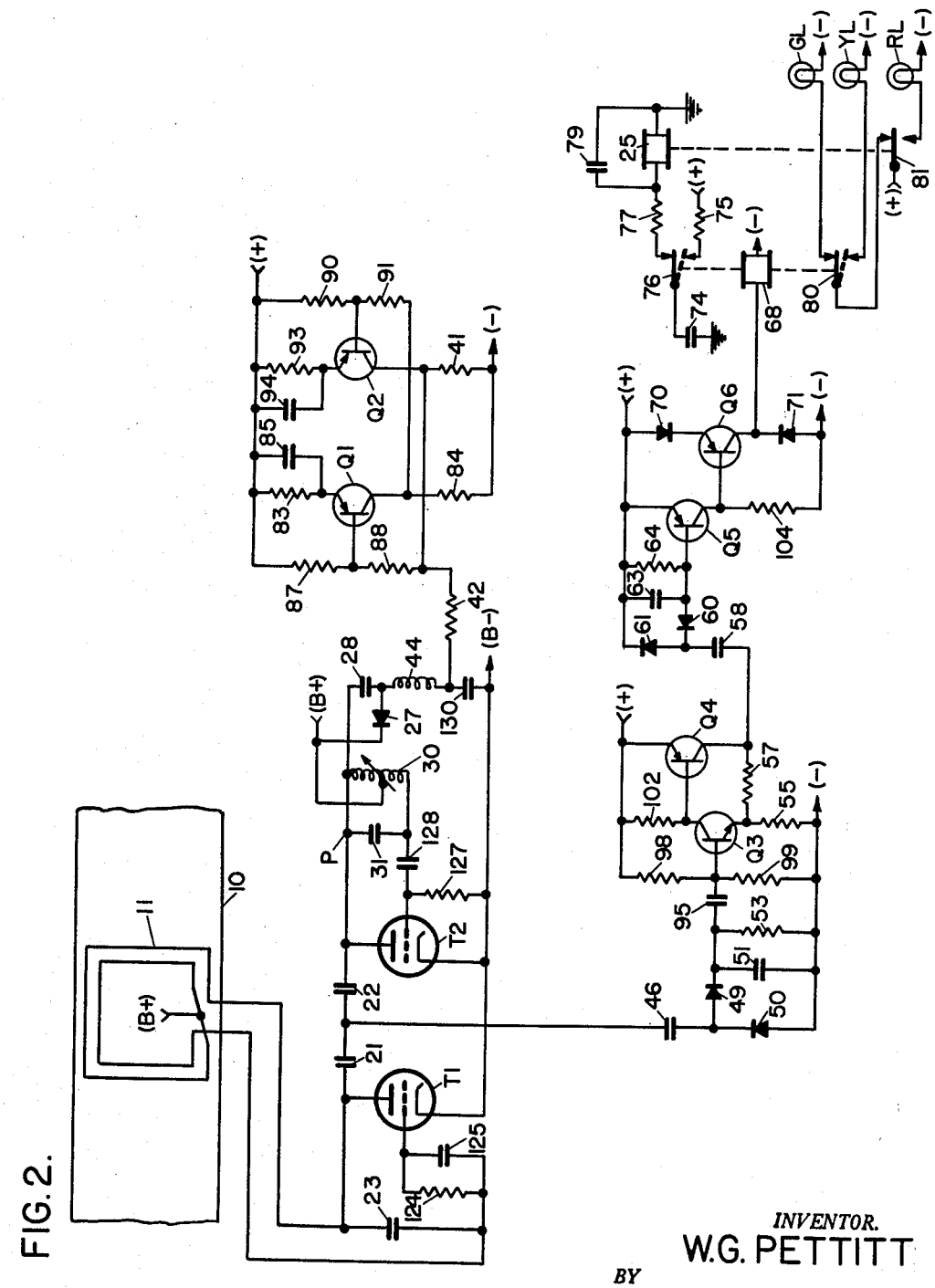
FIG. 2 illustrates by detailed circuitry the embodiment of the present invention.

Referring to FIGS. 1 and 2, it is seen that the frequency control circuit 17 includes two PNP type transistors Q1 and Q2 with associated resistors and capacitors which are adapted to comprise a free-running multivibrator. The arrangement of the elements for circuit 17 is such that it will always assume one condition of operation with the application of supply voltage. For the present condition, however, it is assumed that transistor Q1 is conducting and transistor Q2 is in a nonconducting condition. Under these conidtions, a negative (−) potential is supplied from (−), through resistor 41, through resistor 42, through a radio frequency choke 44 to the positive (+) side of diode 27. Capacitor 28 is thus effectively disconnected from the upper portion of tank coil 30.

Each of the oscillators 14 and 15 at this time are effectively oscillating at the frequency F1. The outputs taken from the plate circuits of tubes T1 and T2 included with oscillators 14 and 15 respectively are supplied to a first detector through a coupling capacitor 46. The action of the detector which includes diodes 49 and 50, capacitor 51 and a resistor 53 provided for bleeding the charge from capacitor 51 is ineffective to provide an output since the similar frequencies when combined cancel. The A.C. amplifier 36 which comprises NPN type transistor Q3 and PNP type transistor Q4 with associated resistors remain in the normally semiconductive conditions as provided by the biasing conditions of the associated resistors. Under these conditions of operation, no alternating current signal is provided at the output of amplifier 36 which is normally taken from the positive (+) side of resistor 57 and supplied to detector 37 through a coupling capacitor 58. Detector 37 which includes diodes 60 and 61, capacitor 63 and a resistor 64 provided for the purpose of bleeding the charge from capacitor 63 is ineffective to provide an output to the D.C. amplifier 39. Amplifier 39 which includes PNP type transistors Q5 and Q6 remains in its normally biased condition where transistor Q5 is in a nonconducting state according to a positive (+) potential being supplied through resistor 64 to the base thereof and transistor Q6 is in a conducting state according to a negative (−) potential being supplied through resistor 104 to the base thereof.

Indication lamp GL is caused to be illuminated during the normal conducting condition of transistor Q6 which provides that a relay 68 included in circuit 19 and relay 25 be energized. The circuit for transistor Q6 during its conducting condition extends from (+), through diode 70 provided for the purpose of biasing transistor Q6, through transistor Q6 from the emitter to collector through the base thereof, through the winding of relay 68, to (−). In this conduction circuit, relay 68 is energized. In the now energized condition of relay 68, relay 25 is energized by a circuit extending from the positive (+) side of capacitor 74, through front contact 76 of relay 68, through resistor 77, to the winding of relay 25, to ground. Also, a capacitor 79 connected in shunt with relay 25 is also charged at this time and is provided for controlling the release of relay 25 when relay 68 is deenergized under occupancy detection circumstances. With relays 25 and 68 respectively energized, lamp GL is illuminated by a circuit extending from (+), through front contact 81 of relay 25, through front contact 80 of relay 68, through the filament of lamp GL, to (−).

If it is assumed that the opposite normal condition prevails, i.e., the frequency of oscillation for oscillator 15 is changed to frequency F3, diode 27 must be biased in order to connect capacitor 28 across the upper portion of tank coil 30. To effect this, transistor Q2 included with circuit 17 must be in a conductive state, while transistor Q1 also included therewith must be in a nonconductive state.

During the conducting condition of tranisstor Q1 assumed above, the conducting circuit therefor extends from (+), through resistor 83, through transistor Q1 from emitter to collector through the base thereof, through a resistor 84, to (−). Capacitor 85 connected in shunt with resistor 83 is also charged during this circuit operation. The base circuit for transistor Q1 is effectively biased by a circuit extending from (+), through resistor 87, through resistor 88, through resistor 41, to (−). When capacitor 85 becomes fully charged and subsequently initiates a discharge through resistor 83, the current flow through transistor Q1 is effectively decreased to the extent that the bias provided for the base circuit of transistor Q2 by a circuit extending from (+), through resistor 90, through resistor 91, through resistor 84, to (−) is changed to a more negative-going signal according to the decreased voltage drop across resistor 84. Transistor Q2 is placed in a conducting condition and conducts through the circuit extending from (+), through resistor 93 and capacitor 94 connected in shunt, through transistor Q2 from emitter to collector through the base thereof, through resistor 41, to (−). A positive-going signal taken from the positive (+) side of resistor 41 is supplied to the base of transistor Q1 for causing the nonconduction thereof and is supplied to diode 27 through resistor 42 and radio frequency choke 44 which causes diode 27 to be forward biased according to current flowing in coil 30.

The inclusion of capacitor 28 across the upper portion of tank coil 30 is effective to change the frequency of oscillation for oscillator 15 to frequency F3 and this frequency F3 will be lower than frequency F1 as determined by the value of capacitor 28. The outputs coupled from oscillators 14 and 15 through capacitors 21 and 22 detector 35 through capacitor 46 thus have different frequencies. Detector 35 is then effective to combine the alternating current voltages of different frequencies in the usual manner so as to produce at its output a difference frequency signal including a direct current signal. The direct current signal is decoupled from the difference frequency signal by capacitor 95 and the difference freqeuncy signal is then supplied to the base of transistor Q3. This signal, being of an alternating current nature and commonly referred to as a heterodyne signal, causes transistor Q3 to be operated between its conductive state and nonconductive state according to the values of the signal with respect to a base biasing circuit. Transistor Q4, being directly responsive to the operation of transistor Q3, is operated between its conductive state and nonconductive state in a manner to cause an amplified heterodyne signal to be supplied to detector 37. The amplified heterodyne signal is rectified by detector 37 and is adapted to provide a negative-going output signal which is supplied to amplifier 39 for causing a reversal of operation for transistors Q5 and Q6.

During normal conditions, a biasing circuit for transistor Q3 extending from (+), through resistor 98, through resistor 99, to (−) normally places the base of transistor Q3 at a positive (+) potential. Transistor Q3 is then biased into conduction with current flowing from (+), through resistor 102, through transistor Q3 from its collector to emitter through the base circuit thereof, through resistor 55, to (−). A voltage drop across resistor 102 places the base of transistor Q4 at a negative (−) potential which causes the conduction thereof through a circuit extending from (+), through transistor Q4 from its emitter to collector through its base circuit thereof, through resistor 57, through resistor 55, to (−). With the heterodyne signal being supplied to the base circuit of transistor Q3 for the interval that oscillator 15 is oscillating at frequency F3, the biasing conditions thereof are changed to the extent that transistor Q3 conducts and nonconducts according to the signal. Similarly, transistor Q4 is made to follow the operation of transistor Q3 inasmuch as its biasing circuit is included in the conducting circuit of transistor Q3. An amplified version of the heterodyne signal is then produced at the positive (+) side of the resistor 57 which is coupled into detector 37 having diodes 60 and 61 and capacitor 63 and which is effective to act upon the amplified heterodyne signal to the extent that capacitor 63 is charged to twice the voltage level of such amplified heterodyne signal. The negative (−) side of capacitor 63 being connected to the base of transistor Q5 causes this transistor to become conductive through a circuit which extends from (+), through transistor Q5 from its emitter to collector through its base thereof, through resistor 104, to (−). Transistor Q6 having its base connected to the positive (+) side of resistor 104 is biased to a nonconductive condition as transistor Q5 conducts and for the interval thereof. As mentioned above, the energizing circuit for relay 68 is dependent upon the conducting condition of transistor Q6. In the nonconductive condition of transistor Q6, the collector circuit thereof is placed at (−) so as to cause relay 68 to be deenergized.

In the deenergized condition of relay 68, the energizing circuit for relay 25 described above as including front contact 76 of relay 68 is disconnected. Relay 25 will remain energized, however, as capacitor 79 is discharged therethrough until relay 68 is once again energized for reconnecting the circuits described above. In the deenergized condition of relay 68, lamp YL is illuminated by a circuit extending from (+), through front contact 81 of relay 25, through back contact 80 of relay 68, through the filament of lamp RL, to (−). The illumination of lamp YL is then indicative of the condition where oscillator 15 is oscillating at the frequency F3.

Figure 3:
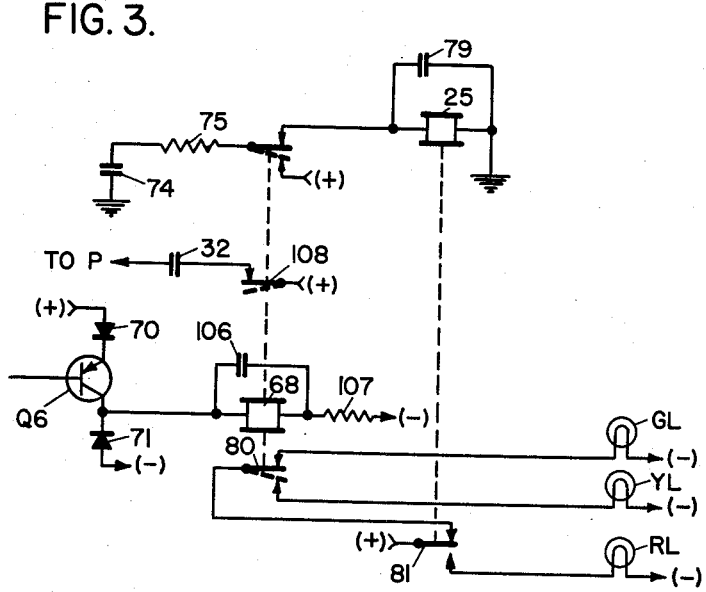
FIG. 3 illustrates an alternate circuit for controlling condition indicating means and means of internally controlling the normal operation of this invention.
Figure 4:
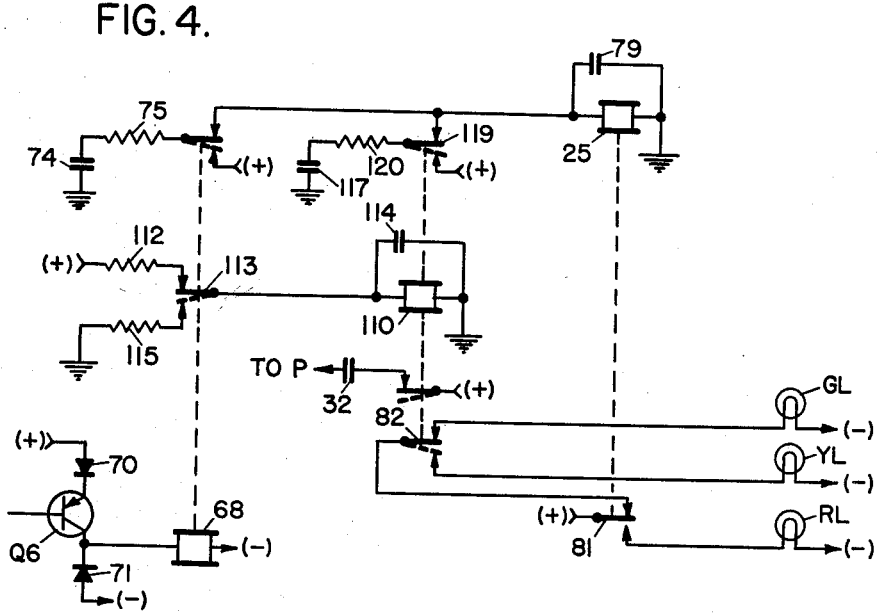
FIG. 4 illustrates another manner of controlling the condition indicating means and the means of internally controlling the normal operation of this invention.

In lieu of the external control provided by frequency control circuit 17, two additional means of providing internal control of oscillator 15 are illustrated in FIGS. 3 and 4.

Referring to FIG. 3, the relay 68 is shown to have a capacitor 106 connected in shunt therewith as well as a resistor 107 connected in series relationship. This resistor-capacitor combination is employed to provide the timing control of relay 68 to its deenergized condition after transistor Q6 is placed in a nonconductive condition. During the energized condition of relay 68, however, capacitor 32 is effectively connected to point P as shown in FIG. 2 with the tank circuit of oscillator 15 which includes tank coil 30 and capacitor 31 through a circuit extending from (+), through front contact 108, through capacitor 32, to point P. In this connection, the frequency of oscillation as determined by capacitors 31 and 32 and tank coil 30 is effectively changed and this frequency is lower than frequency F1. When relay 68 is deenergized, this circuit is disconnected which causes the frequency of oscillation for oscillator 15 to be at frequency F1.

Referring to FIG. 4, another relay 110 is employed to be responsive to the conditions of relay 68 and is effective to control the operation of relay 25 as well as the connection of capacitor 32 to point P. In this illustration the action of the circuit organization is somewhat faster than that shown in FIG. 3 in that the action of relay 68 is not retarded in the manner shown in FIG. 3 with the inclusion of capacitor 106. During the energized condition of relay 68, relay 110 is energized by a circuit extending from (+), through resistor 112, through front contact 113 of relay 68, through the winding of relay 110 to ground. A capacitor 114 connected in shunt with relay 110 is also charged during this operation. In the deenergized condition of relay 68, capacitor 114 is discharged through back contact 113 of relay 68 and resistor 115 with the relay 110 being deenergized when insufficient current flows through the winding thereof according to the discharge of capacitor 114. Relay 25 is controlled by the charge on capacitor 74 as well as the charge on a capacitor 117 which is provided by a circuit extending from (+), through back contact 119 of relay 110, through a resistor 120, through capacitor 117, to ground. The sustained energization of relay 25 under normal system operation causes the lamps GL and YL to be alternately illuminated according to the energizing circuits therefor being completed through front contact 81 of relay 25 and the front and back contact 82 of relay 110.

If it is assumed that at least one conveyance comes within the area defined by coil loop 11, the inductance thereof is influenced to the extent that the frequency of oscillation for oscillator 14 is changed to frequency F2. During the interval that such conveyance is within the confines of coil loop 11, this frequency of oscillation F2 prevails. The frequency of oscillation for oscillator 15 may be at frequency F1 or frequency F3 according to the type of control employed for oscillator 15, i.e., either frequency control circuit 17 or the control relay circuits 19 as shown in FIGS. 3 and 4.

Irrespective of the control employed to change the frequency of oscillation for oscillator 15, a difference frequency is detected by detector 35, amplified by amplifier 36, rectified by detector 37 and employed by amplifier 39 to control relay 68 to a deenergized condition for the interval that a conveyance affects the frequency of oscillation for oscillator 14. The circuits 35, 36, 37 and 39 are responsive similar to the manner described above even though the difference frequency resulting from the frequencies being combined may be somewhat different than occurs under normal conditions. As long as this difference frequency prevails and relay 25 is effectively deenergized, the lamp RL is adapted to be illuminated through a circuit including back contact 81 of relay 25 with the illumination thereof being indicative of a conveyance being detected within the coil loop 11.

To insure that each of the oscillators 14 and 15 are initiated into operation with the supply voltage provided thereto, grid-leak bias circuits are employed. For oscillator 14, a grid resistor 124 is employed in shunt with a grid capacitor 125 in order to provide that the coil loop 11 is somewhat insensitive to extraneous objects. That is, with this grid-leak bias circuit arrangement, more grid drive is required in order to cause tube T1 to become conductive. On the other hand, grid resistor 127 is connected from the grid to the cathode of tube T2 while capacitor 128 is connected in the grid circuit of tube T2 in the usual manner. In the operation of tube T2, capacitor 130 is provided for the purpose of filtering out radio frequency currents.

Having described a presence detection system and alternate forms thereof, as specific embodiments of the present invention, it is desired to be understood that these forms are selected to facilitate in the disclosure of the invention rather than to limit the number of forms which it may assume; and, it is to be further understood that various other modifications, adaptations and alterations may be applied to the specific forms shown to meet the requirements of practice without in any manner departing from the spirit or scope of the present invention.

What I claim is:

1. Apparatus for detecting the presence of motor vehicles, metallic objects and the like, as they pass through a detection zone comprising:

(a) a first oscillator having a coil so positioned that each said vehicle is in an inductive coupling relationship with said coil while in said zone, (b) means controlling said oscillator normally to oscillate and energize said coil with electrical energy of a first frequency F1 when no vehicle is in said detection zone and alternatively to oscillate and energize said coil with electrical energy at a frequency F2 when a vehicle is in said detection zone, (c) a second oscillator controlled at times to oscillate at said same frequency F1 and at other times to oscillate at a frequency F3 different from both F1 and F2, (d) oscillator control means connected to said second oscillator for repetitively changing its operating frequency between said frequencies F1 and F3, (e) output means connected to both said oscillators and responsive to the difference in frequency of the signals generated respectively thereby for indicating the presence of a vehicle in said detection zone when continuously throughout at least a predetermined interval a difference in frequency exists between the outputs of said first and second oscillators.

2. The apparatus of claim 1 which further includes indication means connected to said output means and providing distinctive indication only when intermittently and successively said oscillators operate at the same and different frequencies.

3. The apparatus of claim 1 wherein said output means controls said second oscillator to operate at frequency F3 when said first and second oscillators are detected as operating on the same frequency F1 and controls said second oscillator to operate at frequency F1 when said first and second oscillators are detected as operating on different frequencies.

4. The apparatus of claim 1 which further includes means coupling said first oscillator to said second oscillator to thereby cause said first oscillator to operate at exactly the frequency F1 of said second oscillator when no vehicle is within said detection zone.

5. The apparatus of claim 1 in which said predetermined interval exceeds the maximum interval that said second oscillator operates at its frequency F3.

6. The apparatus of claim 1 wherein said oscillator control means includes multivibrator means for controlling said second oscillator to alternately operate at its two respective frequencies at a rate determined by the frequency of said multivibrator.

7. The apparatus of claim 6 in which said second oscillator includes a resonant tank circuit, a reactance element adapted to be connected at times in circuit with said tank circuit to change its frequency of resonance, a diode connected in series with said reactance element, means for normally back-biasing said diode, said multivibrator means when in one of its two conditions overcoming said back-bias on said diode.

References Cited by the Examiner
UNITED STATES PATENTS

| | | | |
|---|---|---|---|
| 1,717,630 | 6/29 | Schaffer | 340—258 |
| 2,390,221 | 12/45 | Lindsay | 340—258 |
| 2,421,771 | 6/47 | Browning | 340—258 |
| 2,428,290 | 9/47 | Peck | 340—258 |
| 2,454,687 | 11/48 | Baughman | 340—258 |
| 2,499,177 | 2/50 | Baughman | 340—258 |
| 2,537,298 | 1/51 | Baughman | 340—258 |
| 2,558,445 | 6/51 | Laurenson | 340—258 |
| 2,646,559 | 7/53 | Nutzler | 340—258 |
| 2,652,551 | 9/53 | Gumpertz | 340—258 |
| 2,721,994 | 10/55 | Brown | 340—258 |
| 2,917,732 | 12/59 | Chase et al. | 340—258 |

FOREIGN PATENTS 719,179  11/54  Great Britain.

NEIL C. READ, *Primary Examiner.*